(12) United States Patent
Ohashi (10) Patent No.: US 7,752,558 B2
(45) Date of Patent: Jul. 6, 2010

(54) PLANT OPERATION SUPPORTING APPARATUS AND PLANT OPERATION SUPPORTING METHOD

(75) Inventor: Masayasu Ohashi, Musashino (JP)

(73) Assignee: Yokogawa Electric Corporation, Musashino-shi (JP)

( * ) Notice: Subject to any disclaimer, the term of this patent is extended or adjusted under 35 U.S.C. 154(b) by 512 days.

(21) Appl. No.: 11/789,621

(22) Filed: Apr. 25, 2007

(65) Prior Publication Data

US 2007/0265716 A1   Nov. 15, 2007

(30) Foreign Application Priority Data

Apr. 28, 2006  (JP) .......................... P.2006-125321

(51) Int. Cl.
  *G06F 3/00* (2006.01)
  *G06F 9/44* (2006.01)
(52) U.S. Cl. .......................... 715/763; 715/765; 700/83
(58) Field of Classification Search ................ 715/763, 715/764, 765, 781, 965, 967, 970; 700/95, 700/97, 108, 109
See application file for complete search history.

(56) References Cited

U.S. PATENT DOCUMENTS

| | | | | |
|---|---|---|---|---|
| 5,408,603 | A * | 4/1995 | Van de Lavoir et al. ..... | 715/763 |
| 5,631,825 | A * | 5/1997 | van Weele et al. ........... | 700/83 |
| 5,970,437 | A * | 10/1999 | Gorman et al. .............. | 702/184 |
| 6,882,892 | B2 * | 4/2005 | Farrah et al. ................... | 700/97 |
| 7,251,534 | B2 * | 7/2007 | Walls et al. .................... | 700/17 |
| 7,539,604 | B1 * | 5/2009 | Stothert et al. ................ | 703/6 |
| 2003/0139837 | A1 * | 7/2003 | Marr .......................... | 700/110 |
| 2004/0039468 | A1 * | 2/2004 | Zahorack et al. .............. | 700/97 |
| 2005/0086635 | A1 * | 4/2005 | Parikh et al. ................. | 717/103 |
| 2005/0143851 | A1 * | 6/2005 | Scalfani et al. .............. | 700/108 |
| 2006/0161416 | A1 * | 7/2006 | Tramontana ................. | 703/22 |

FOREIGN PATENT DOCUMENTS

JP  2004-164150  6/2004

* cited by examiner

*Primary Examiner*—X. L Bautista
(74) *Attorney, Agent, or Firm*—Westerman, Hattori, Daniels & Adrian, LLP (57) ABSTRACT

A plant operation supporting apparatus includes a display section which displays at least one of an operation procedure screen for displaying an operation procedure defined by components and wiring in a flowchart format, or an operation procedure screen for displaying an operation procedure defined by components and wiring in a logic chart format, and an execution section which supports a plant operation in accordance with the operation procedure being displayed, wherein the display section displays an operation procedure screen for displaying an operation procedure defined by components and wiring in a data flow format, in combination with the operation procedure screen in the data flow format or the operation procedure screen in the logic chart format.

12 Claims, 7 Drawing Sheets

PLANT OPERATION SUPPORTING APPARATUS AND PLANT OPERATION SUPPORTING METHOD

This application claims foreign priority based on Japanese Patent application No. 2006-125321, filed Apr. 28, 2006, the content of which is incorporated herein by reference in its entirety.

BACKGROUND OF THE INVENTION

1. Field of the Invention

The present invention relates to a plant operation supporting apparatus and a plant operation supporting method thereof, which includes a display section which displays at least one of an operation procedure screen for displaying an operation procedure defined by components and wiring in a flowchart format, or an operation procedure screen for displaying an operation procedure defined by components and fwiring in a logic chart format, and an execution section which supports a plant operation in accordance with the operation procedure being displayed.

2. Description of the Related Art

In order to operate a plant safely and stably, a distribution control system is used in which an operator always monitors occurrence of an alarm and state transition of processes in plant devices. In recent years, in addiction to the distribution control system, a plant operation supporting apparatus is introduced so that techniques and know-how of an experienced operator as to operations for responding to the alarm are replaced by a computer, thereby to contribute to the improvement of operation efficiency and the load reduction of an operator.

In the plant operation supporting apparatus, as a method of describing the know-how of experienced operators, there exists two kinds of methods, that is, a flowchart format mainly directed to non-steady operation and a logic chart format directed to steady operation.

Figure 8:
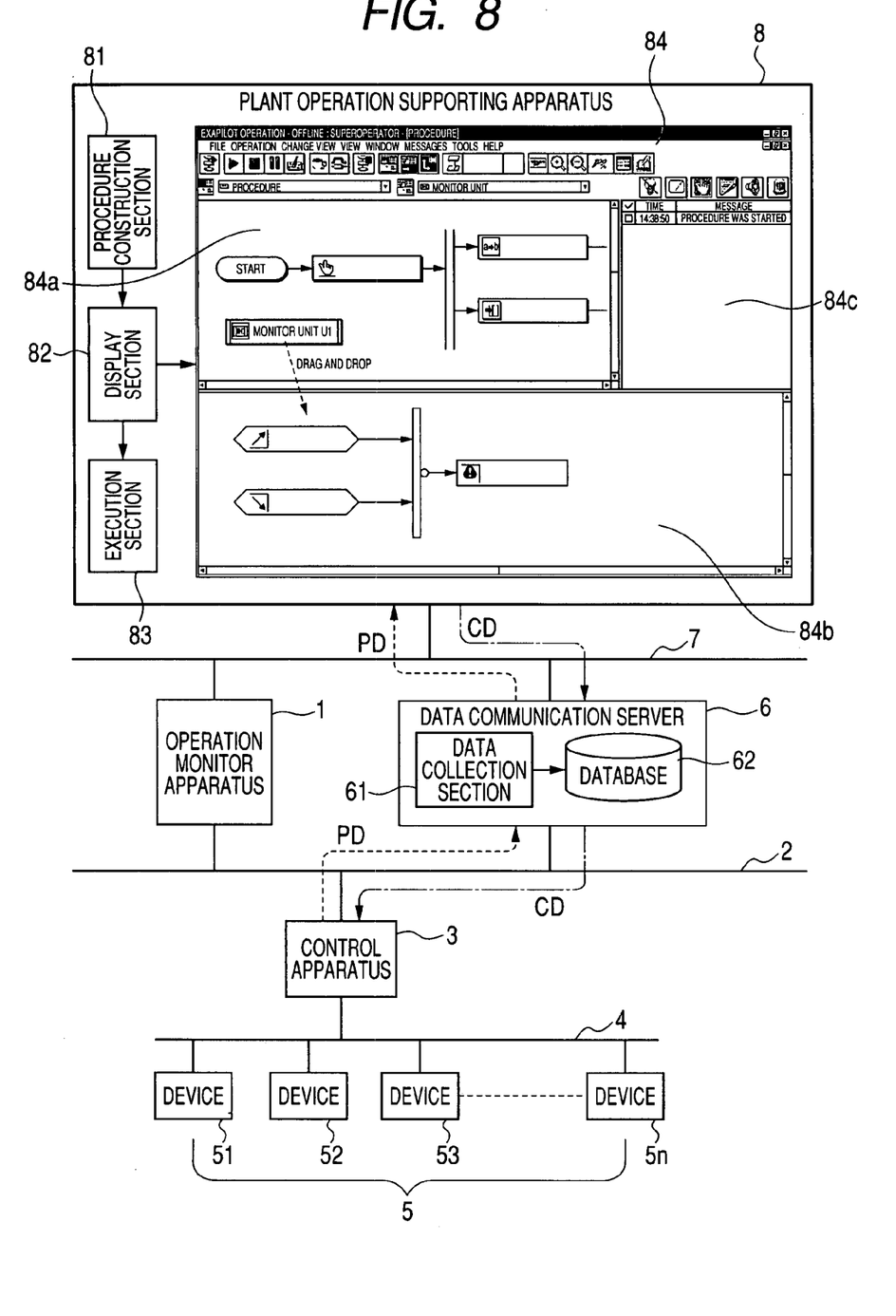
FIG. 8 is a functional block diagram showing an example of the configuration of a distribution type control system to which a plant operation supporting apparatus of a related art disclosed in JP-A-2004-164150 is connected.

FIG. 8 is a functional block diagram showing an example of the configuration of a plant operation supporting apparatus of a related art disclosed in JP-A-2004-164150, which shows a mode where the plant operation supporting apparatus is connected as a higher-level apparatus of a distribution type control system.

The operation monitor apparatus 1 of the distribution type control system is connected to a control bus 2. A control apparatus 3 is connected to the control bus 2 to communicate with the operation monitor apparatus 1, and also communicates with devices 51, 52, 53, . . . , 5n of a plant 5 via a field bus 4 to execute control of these devices.

A data communication server 6 is connected to the control bus 2, and a data collection section 61 obtains process data PD from the control apparatus 3 and a database 62 holds the process data PD. The database 62 holds real time data of a predetermined period and historical data which is obtained by processing the real time data into long-term trend information.

The operation monitor apparatus 1 and the data communication server 6 is connected to a general-purpose network 7 represented by Ethernet (trade mark), and communicate with a plant operation supporting apparatus 8 connected to the general-purpose network 7.

The plant operation supporting apparatus 8 obtains the process data PD from the database 62 of the data communication server 6, and outputs control data CD for executing the processing result to the control apparatus 3 via the data communication server 6 and the control bus 2.

In the plant operation supporting apparatus 8, a procedure construction section 81 having a builder function generates a component, which is a process unit, and registers the generated component with an icon, and describes sequence and logic by wiring connection between the components.

A display section 82 displays a working screen used by the builder of the procedure construction section 81 and an operation screen displayed upon execution of the constructed sequence or logic. An execution section 83 executes the sequence or the logic that is confirmed by an operator on the operation screen.

The control data CD from the execution section 83 is notified to the data communication server 6 via the general-purpose network 7, and further notified to the control apparatus 3 via the control bus 2 thereby to execute a predetermined sequence or logic.

The plant operation supporting apparatus 8 shown in FIG. 8 displays an operation screen 84 according to a multi-window function of the display section 82. The operation screen 84 is configured by a flowchart form at screen 84a displaying the entirety of a sequence, a logic chart format screen 84b which is displayed in detail by clicking a monitor unit U1 of a logic chart format described on the flowchart format screen 84a, and a message screen 84c for displaying the progress state of the sequence.

In this manner, the plant operation supporting apparatus of the related art can describe an operation procedure in the flowchart format or the logic chart format. The flowchart and the logic chart can be described on the same sheet and can perform data communication between with each other.

In the flowchart format, the procedure is executed only once according to the wiring order of the components. When an error occurs in executing the component, the process is interrupted on the way thereof. When the process of the component is completed and a control signal flows through the wiring, the next component of the wiring destination is executed.

In the logic chart format, all the components operate during an execution period and so the process is not interrupted on the way thereof. Although the process is operated according to the wiring order, the process is repeatedly operated at every designated execution period. A control signal of "true/false" flows through the wiring between the components to determine whether or not the next component is to be executed.

The functions provided by the plant operation supporting apparatus of the related art have the following problems.

(1) The operations handled by the flowchart format and the logic chart format are ones that use four arithmetic operations or functions having formulas and that can be closed in respective components. Thus, the operation is specialized to scalar operation. In order to perform a complicated operation that has no formula or an operation of a matrix, it is necessary to use a special component for requesting an external interface thereby to obtain a solution by using a package specialized to the operation.

(2) In the flowchart format and the logic chart format, only a control signal for executing the component is transmitted through a wiring connecting between components, and it is necessary to transmit data such as an operation result to the next component by using a special variable. Thus, in a case of dealing with a process in which the operation does not close within a single component, many variables for transferring data are required and so a description sheet becomes complicated.

(3) Among the operations, there are many operations in which a solution cannot be obtained by a single calculation. In this case, generally a method is employed in which a repetitive calculation is performed to obtain an approximate solution. Even if a repetitive calculation having an execution cycle like the logic chart is used, the process requires a long time when the number of the repetitions is large. Further, in a process of a form at in which an operation is executed only once as a principle, such as the flowchart format, it is further difficult to describe the logic for such a kind of the operation.

(4) In the field of a continuous process system such as petroleum or petrochemistry, scalar (one-dimensional) data is enough for data to be dealt. However, in a discrete system such as car manufacturing (for example, optimization of the parameters of the electronic control unit (ECU) of an engine), vector (two-dimensional) data is necessary. Thus, the high functionalization of the operation process is required in order to apply an operation efficiency improvement support package to different industries.

SUMMARY OF THE INVENTION

The present invention has been made in view of the above circumstances, and provides a plant operation supporting apparatus and a plant operation supporting method thereof, having an interface which can simply describe an operation procedure by merely arranging the same components and wiring as those of the flowchart format or the logic chart format without depending a complicated operation process or a matrix operation on an external function.

In some implementations, a plant operation supporting apparatus of the invention, comprising:

a display section which displays at least one of an operation procedure screen for displaying an operation procedure defined by components and wiring in a flowchart format, or an operation procedure screen for displaying an operation procedure defined by components and wiring in a logic chart format; and an execution section which supports a plant operation in accordance with the operation procedure being displayed, wherein the display section displays an operation procedure screen for displaying an operation procedure defined by components and wiring in a data flow format, in combination with the operation procedure screen in the flowchart format or the operation procedure screen in the logic chart format.

In the plant operation supporting apparatus, data of an operation result is transmitted and received between the components being wired in the components and wiring in the data flow format.

In the plant operation supporting apparatus, the components and wiring in the data flow format are arranged to transmit true/false of an operation result to the components and wiring in the flowchart format via an Yes/No output component.

In the plant operation supporting apparatus, the components and wiring in the data flow format are arranged to transmit true/false of an operation result to the components and wiring in the logic chart format via a true/false output component.

In the plant operation supporting apparatus, the display section displays a variable definition unit which defines variables that are in common among the flowchart format, the logic chart format and the data flow format.

In the plant operation supporting apparatus, the display section includes a definition window for managing the variables defined in the variable definition unit.

In some implementations, a plant operation supporting method of the invention, comprising:

displaying at least one of an operation procedure screen for displaying an operation procedure defined by components and wiring in a flowchart format, or an operation procedure screen for displaying an operation procedure defined by components and wiring in a logic chart format;

supporting a plant operation in accordance with the operation procedure being displayed; and displaying an operation procedure screen for displaying an operation procedure defined by components and wiring in a data flow format, in combination with the operation procedure screen in the flowchart format or the operation procedure screen in the logic chart format.

DESCRIPTION OF THE PREFERRED EMBODIMENTS

Figure 1:
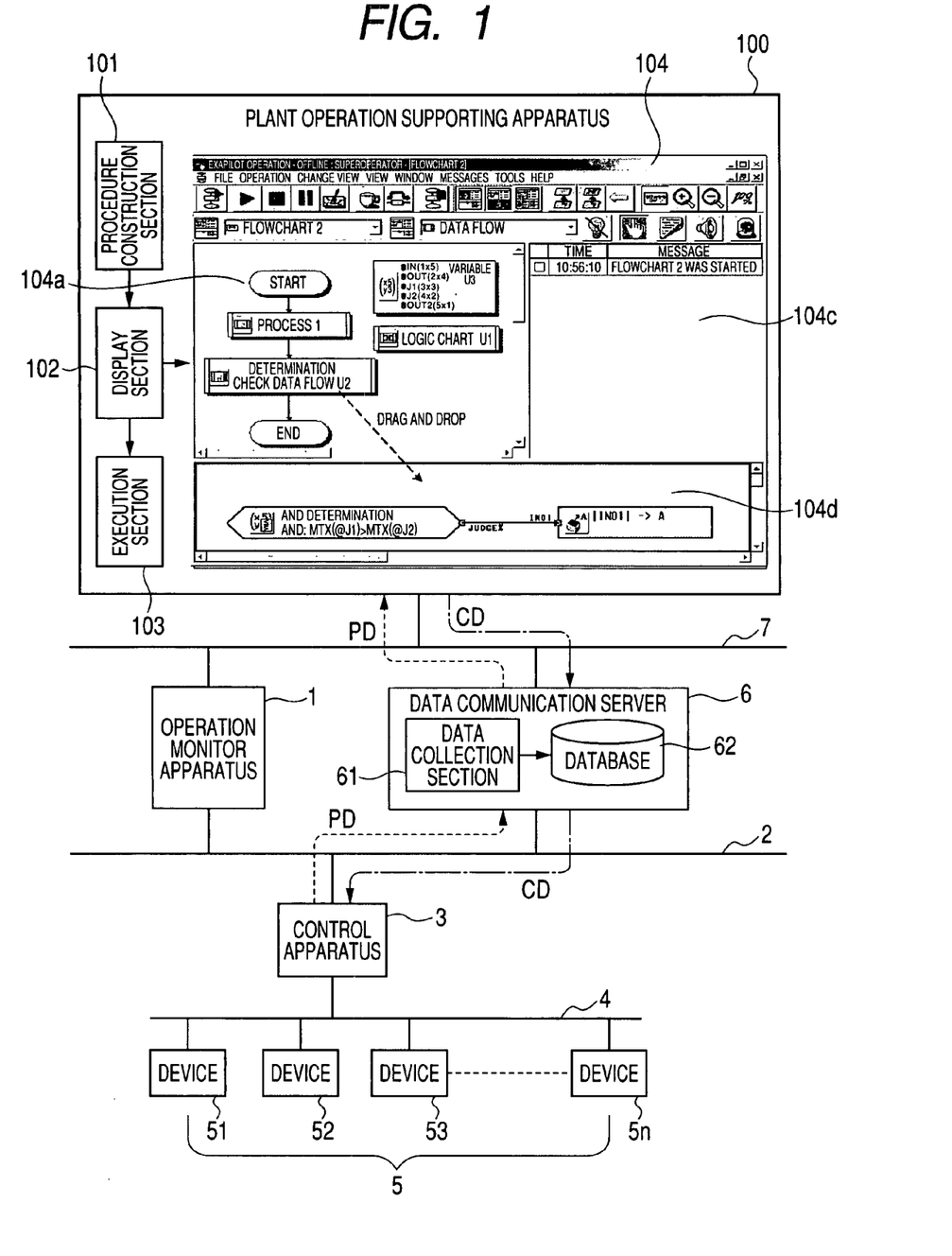
FIG. 1 is a functional block diagram showing an embodiment of a distribution type control system being connected to a plant operation supporting apparatus to which the invention is applied.

Hereinafter, the invention will be explained in detail with reference to drawings. FIG. 1 is a functional block diagram showing an embodiment of a distribution type control system being connected to a plant operation supporting apparatus to which the invention is applied. In the figure, elements identical to those of FIG. 8 are referred to by the same reference numerals, with explanation thereof being omitted.

In the plant operation supporting apparatus 100 to which the invention is applied, a procedure construction section 101 having a builder function has basically the same function as the procedure construction section 81 of the related art. The procedure construction section generates a component, which is a process unit, and registers the generated component with an icon, and describes sequence and logic by wiring connection between the components. In addition to this function, in the present invention, a function for describing a data flow is added.

A display section 102 displays a working screen used by the builder of the procedure construction section 101 and an operation screen displayed upon execution of the constructed sequence, logic and data flow. An execution section 103 executes the sequence, logic or data flow that is confirmed by an operator on the operation screen.

Control data CD from the execution section 103 is notified to a data communication server 6 via a general-purpose network 7, and further notified to a control apparatus 3 via the control bus 2 thereby to execute a predetermined sequence or logic.

The plant operation supporting apparatus 100 shown in FIG. 1 displays an operation screen 104 according to the multi-window function of the display section 102. The operation screen 104 is configured by a flowchart format screen 104a displaying the entirety of a sequence, a data flow format screen 104d which is displayed in detail by clicking a monitor unit U2 of a data flow format described by being inserted on the way of the flow chart format of this screen, and a message screen 104c for displaying the progress state of the sequence.

In a unit U3 displayed within the flowchart form at screen 104a, variables (global variables) common to the flowchart format, the logic chart format and the data flow format are defined. This definition can be managed and changed by a definition window which will be described later.

Figure 2:
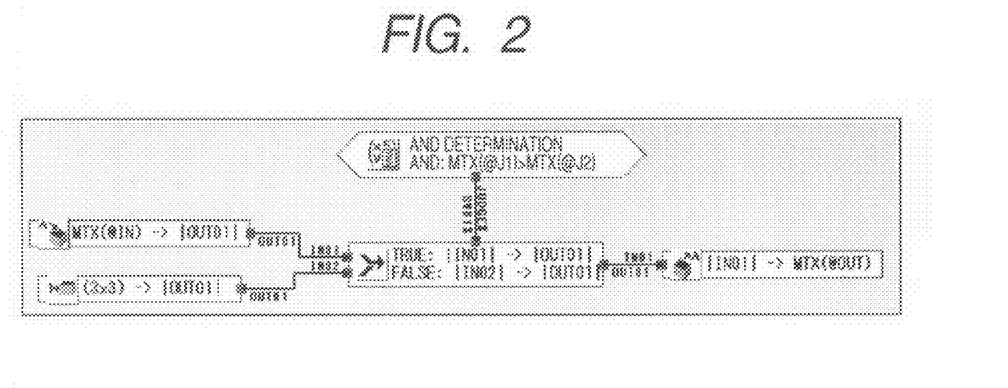
FIG. 2 is an example of the description of the data flow format in which a value to be outputted is selected in accordance with a determination condition.
Figure 3:
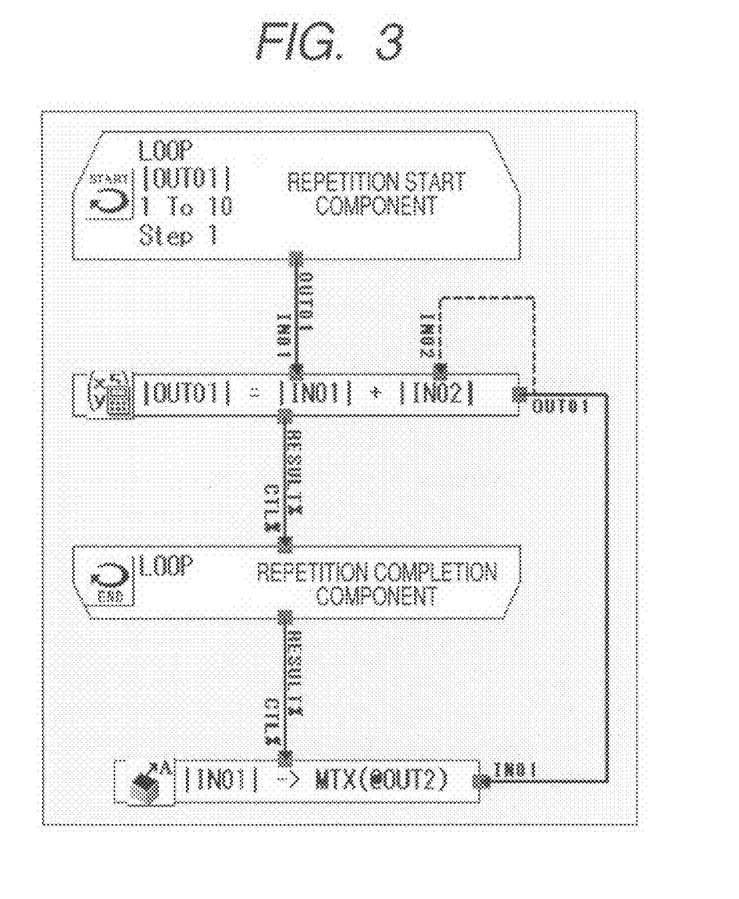
FIG. 3 is an example of the description of the data flow format in which the sum of 1 to 10 is repeatedly calculated and outputted.

FIG. 2 is an example of the description in the data flow format in which the comparative determination of magnitudes of two variables is executed and the value to be outputted is selected in accordance with the determination condition. FIG. 3 is an example of the description of the data flow in which the sum of 1 to 10 is repeatedly calculated and outputted. A subject of the repetitive operation is a component sandwiched between a repetition start component and a repetition completion component.

Each terminal of the components has a name, and the operation process is determined by the terminal to be wired. Hereinafter, the data flow format will be explained. In the data flow format, data, which is a value of the operation result, flows through the wiring. Control information responsible for executing the component also becomes a part of the data.

Each of the terminals has a name, and the functions within the components differ for every terminal name. Functions are clearly differentiated between an input terminal and an output terminal. In FIGS. 2 and 3, each of "OUTxx" and "JUDGExx" represents an output terminal, and data representing the operation result flows through the wiring from the terminal, whilst each of "INxx" and "SWxx" represents an input terminal which receives the data flowing through the wiring.

In this manner, in the data flow format, data representing the value of the operation result of the component is caused to flow from the source of the wiring and received at the wiring destination. Thus, it is not necessary to prepare variables for receiving and transmitting data between components, which are required in the flowchart format and the logic chart format.

In the figure, a CTL % terminal is a special terminal for controlling the execution of a component. For example, the component is executed when a value other than "0" flows, whilst the component is not executed when "0" flows. When this terminal is not wired, the component is executed unconditionally. In the figure, a RESULT % terminal is a special terminal for outputting the execution result of a component. For example, this terminal outputs a value other than "0" at the time of normal execution, whilst outputs "0" at the time of abnormal termination.

In the data flow, the execution cycle like the logic chart format is not provided, and all components including the repetition operation are executed instantaneously. The data flow process is completed when all the components complete the operation execution. A matrix (vector) data may be flown through the terminals and the wirings.

The description in the data flow format differs from the logic chart format in that each terminal has the terminal name. The format of components and wirings in the description in the data flow format is similar to that of the logic chart format. An operation logic can be described without a program, by using the components and wirings. Even in a case of the complicated operation, it is possible to implement the operation by a user by arranging the components and the wiring.

Figure 4:
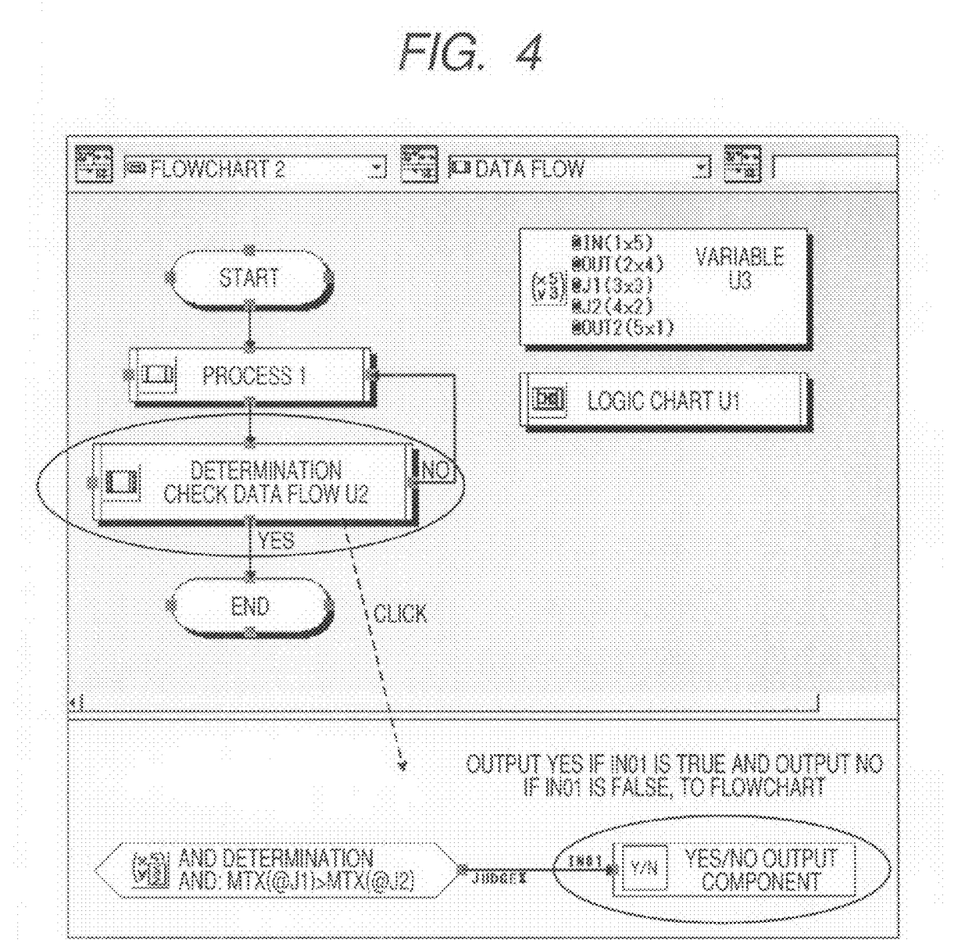
FIG. 4 is a procedure construction screen for coupling the data flow format to the flowchart format.

FIG. 4 is a procedure construction screen, shown in the operation screen in FIG. 1, for making a connection between the data flow format and the flowchart format. The upper portion of the screen shows a flowchart format screen. The contents of a data flow unit U2 being inserted between the components of the flowchart can be displayed in its detailed description at the lower portion of the screen in response to a click operation.

The interface of the wiring between the flowchart and the data flow is implemented by wiring true/false of the operation result in the data flow at an Yes/No output component thereby to give the Yes/No output component to the flowchart as the operation result.

That is, since the operation result of the data flow is wired to the Yes/No output component, the operation result can be outputted as a control signal for the determination to the flowchart. Although an "AND/OR determination" component of the related art can only perform the magnitude comparison and match/mismatch determination of numerical values or characters, more complicated determination can be realized on the flowchart by combining the data flow and the Yes/No output component.

Figure 5:
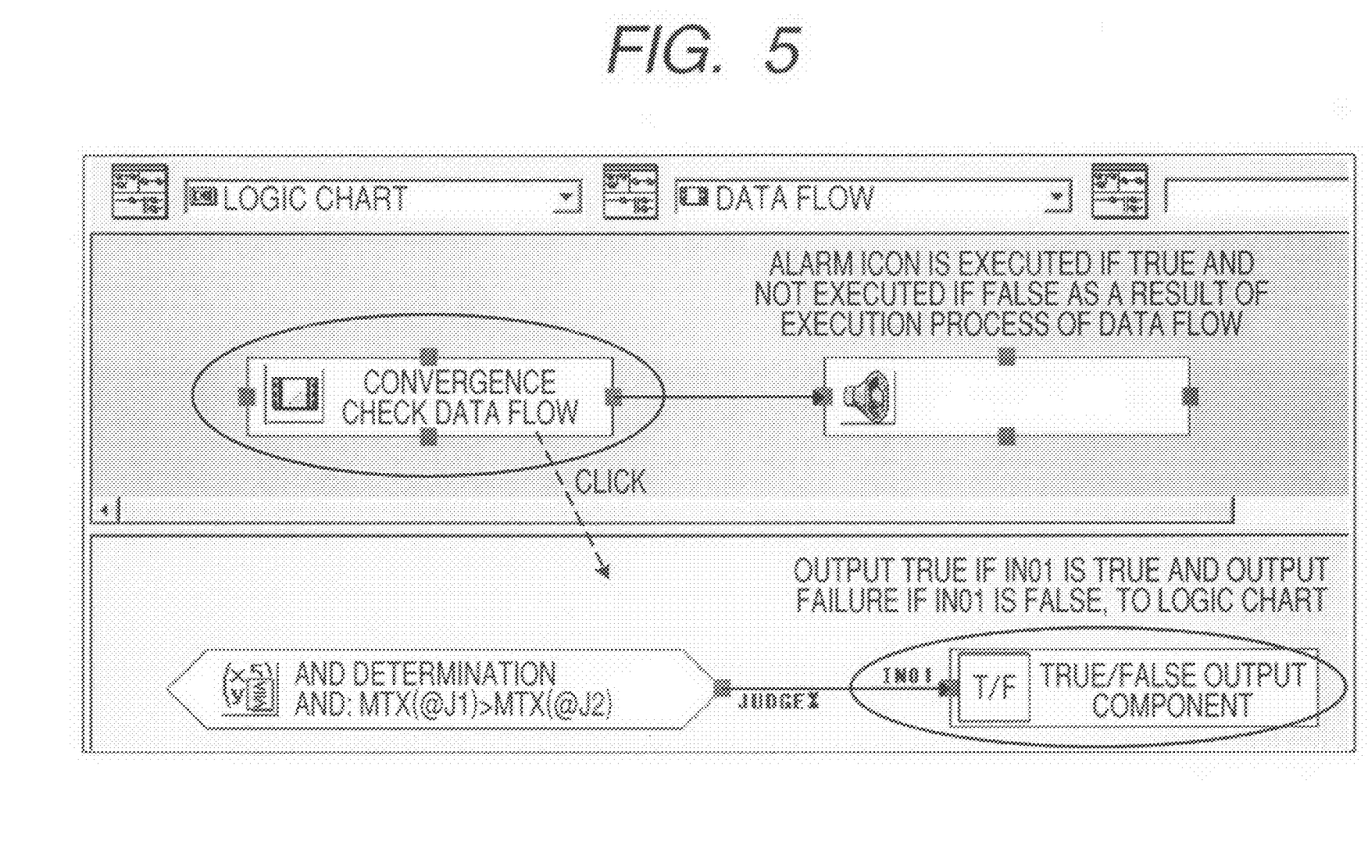
FIG. 5 is a procedure construction screen for coupling the data flow format to the logic chart format.

FIG. 5 is a procedure construction screen for making a connection between the data flow format and the logic chart format. The upper portion of the screen shows a logic chart format screen. The contents of a convergence check data flow unit U2 connected to the component of the logic chart via a wiring can be displayed in its detailed description at the lower portion of the screen in response to a click operation.

The interface of the wiring between the logic chart and the data flow is implemented by wiring the true/false of the operation result in the data flow at a true/false output component thereby to give the true/false output component to the logic chart as the operation result.

That is, since the operation result of the data flow is wired to the true/false output component, the operation result can be outputted as a control signal for determination to the flowchart. Although a "comparison determination" component of the related art can only perform the magnitude comparison and match/mismatch determination of numerical values or characters, more complicated determination can be realized on the flowchart by combining the data flow and the true/false output component.

In addition to the method of using the data flow format, the method of transferring data between the respective formats can also be realized by using global variables that are in common to the respective formats. In the data flow format, the definition can be made by using terminals and the wiring without using variables. However, since each of the components has a definition window, variables and numerical values can be directly inputted by using the definition window, other than defining the flow of data by the wiring.

Figure 6:
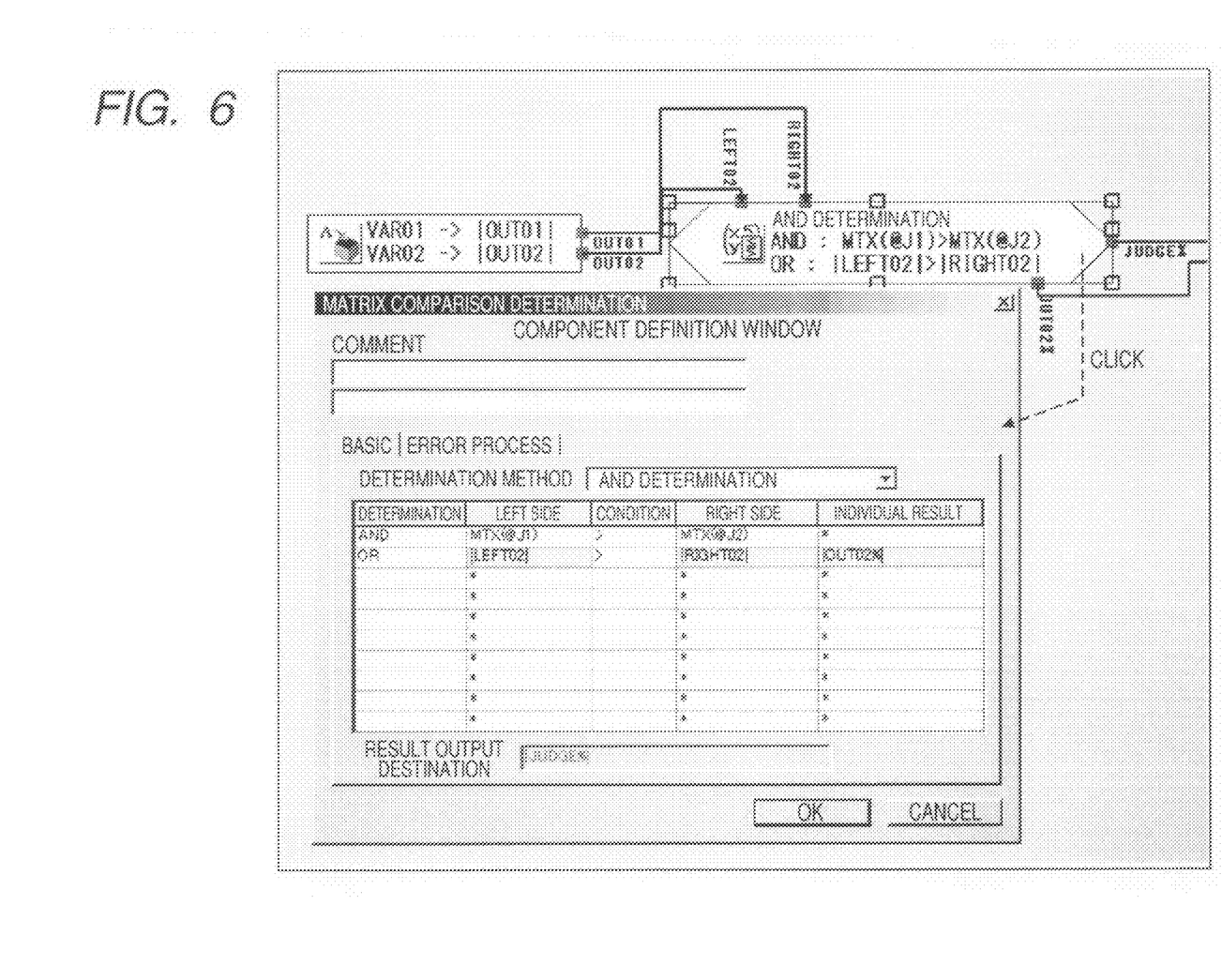
FIG. 6 is an example of a display screen of a definition window of a component provided with a function of defining variables.

FIG. 6 is an example of the display of the definition window of the component provided with a function of defining variables. In a case where the number of the wiring within the data flow becomes large and so the wiring becomes complicated, there is a case that, rather than flowing constants, etc., through the wirings as data, the description of the data flow can be simplified by selecting a short-cut method of the variable definition in which constants, etc., are directly described in the definition window without using the wiring.

Each of the flowchart, logic chart and data flow is encapsulated in a "unit" basis. It is possible to output a control command such as execution or stop to the data flow (unit) by using various kinds of control command components on the flowchart or the logic chart.

Figure 7:
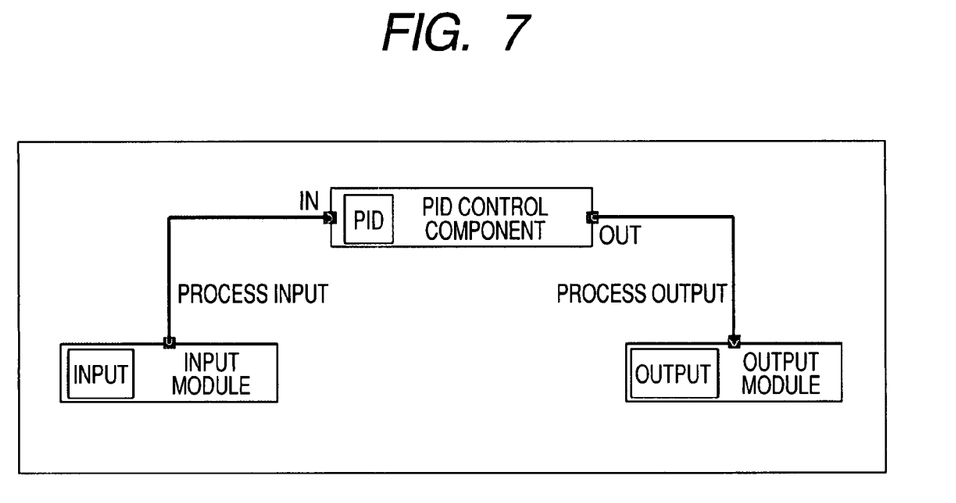
FIG. 7 is an example of the description of the data flow developed to a control logic format.

FIG. 7 is an example of the description of the data flow developed to a control logic format. It is possible to arrange components constituting control logic, such as a PID control (proportional plus integral plus derivative control) component or an analog input component, in the component within the data flow.

A series of describing formats necessary for the continuous process system can be completed in a single package by combining a series of the formats of the flowchart, logic chart, data flow and control logic.

The flowchart, logic chart, data flow and control logic are linking with one another but have independent modes (units), respectively. Thus, it is also possible for a user to select only the format having a necessary function according to a usage.

As clear from the aforesaid explanation, the invention has the following advantages.

(1) Since the data flow format is introduced, a user can write flexible and more complicated operation and determination logic.

(2) Since the data flow format can be mixed in the flowchart format, it is possible to receive the operation result in the flowchart format, perform a complicated determination in the data flow format, and send an operation command to the data flow format from the flowchart format.

(3) Since the data flow format can be mixed in the logic chart format, it is possible to receive the operation result in the logic chart format, perform a complicated determination in the data flow format, and send an operation command to the data flow format from the logic chart format.

(4) Since the data flow format is described by the combination of components, wiring and terminals, a user can write in the data flow format without feeling a sense of incongruity almost in the same manner as the description in the flowchart format and the logic chart format of the related art.

(5) The data flow format can describe not only the wiring between the components via terminals, but also via variables by using a definition window, so that the degree of freedom of describing the logic by a user can be enhanced.

It will be apparent to those skilled in the art that various modifications and variations can be made to the described preferred embodiments of the present invention without departing from the spirit or scope of the invention. Thus, it is intended that the present invention cover all modifications and variations of this invention consistent with the scope of the appended claims and their equivalents.

What is claimed is:

1. A plant operation supporting apparatus, comprising:
a display section which displays at least one of an operation procedure screen for displaying an operation procedure defined by components and wiring in a flowchart format, or an operation procedure screen for displaying an operation procedure defined by components and wiring in a logic chart format; and
an execution section which supports a plant operation in accordance with the operation procedure being displayed,
wherein the display section displays an operation procedure screen for displaying an operation procedure defined by components and wiring in a data flow format, in combination with the operation procedure screen in the flowchart format or the operation procedure screen in the logic chart format.

2. The plant operation supporting apparatus according to claim 1, wherein data of an operation result is transmitted and received between the components being wired in the components and wiring in the data flow format.

3. The plant operation supporting apparatus according to claim 1, wherein the components and wiring in the data flow format are arranged to transmit true/false of an operation result to the components and wiring in the flowchart format via an Yes/No output component.

4. The plant operation supporting apparatus according to claim 1, wherein the components and wiring in the data flow format are arranged to transmit true/false of an operation result to the components and wiring in the logic chart format via a true/false output component.

5. The plant operation supporting apparatus according to claim 1, wherein the display section displays a variable definition unit which defines variables that are in common among the flowchart format, the logic chart format and the data flow format.

6. The plant operation supporting apparatus according to claim 5, wherein the display section includes a definition window for managing the variables defined in the variable definition unit.

7. A plant operation supporting method, comprising:
displaying at least one of an operation procedure screen for displaying an operation procedure defined by components and wiring in a flowchart format, or an operation procedure screen for displaying an operation procedure defined by components and wiring in a logic chart format;
supporting a plant operation in accordance with the operation procedure being displayed; and
displaying an operation procedure screen for displaying an operation procedure defined by components and wiring in a data flow format, in combination with the operation procedure screen in the flowchart format or the operation procedure screen in the logic chart format.

8. The plant operation supporting method according to claim 7, further comprising:
transmitting and receiving data of an operation result between the components being wired in the components and wiring in the data flow format.

9. The plant operation supporting method according to claim 7, wherein the components and wiring in the data flow format are arranged to transmit true/false of an operation result to the components and wiring in the flowchart format via an Yes/No output component.

10. The plant operation supporting method according to claim 7, wherein the components and wiring in the data flow format are arranged to transmit true/false of an operation result to the components and wiring in the logic chart format via a true/false output component.

11. The plant operation supporting method according to claim 7, further comprising:
displaying a variable definition unit which defines variables that are in common among the flowchart format, the logic chart format and the data flow format.

12. The plant operation supporting method according to claim 11, wherein the variables defined in the variable definition unit are managed in a definition window.

* * * * *